(12) United States Patent
Weber et al.

(10) Patent No.: US 8,127,450 B2
(45) Date of Patent: Mar. 6, 2012

(54) METHOD FOR PRODUCING A SANDWICH CONSTRUCTION, IN PARTICULAR A SANDWICH CONSTRUCTION FOR THE AERONAUTICAL AND AEROSPACE FIELDS

(75) Inventors: Hans-Jurgen Weber, Verden (DE); Gregor Christian Endres, Pfaffenhofen (DE)

(73) Assignee: Airbus Operations GmbH, Hamburg (DE)

( * ) Notice: Subject to any disclaimer, the term of this patent is extended or adjusted under 35 U.S.C. 154(b) by 604 days.

(21) Appl. No.: 12/362,433

(22) Filed: Jan. 29, 2009

(65) Prior Publication Data

US 2009/0218724 A1   Sep. 3, 2009

Related U.S. Application Data

(60) Provisional application No. 61/024,961, filed on Jan. 31, 2008.

(51) Int. Cl.
*B32B 3/06* (2006.01)

(52) U.S. Cl. .................. 29/897.32; 29/513

(58) Field of Classification Search ............ 29/897.2, 29/897.32, 509, 513; 264/257, 258, 295, 264/296, 320, 322, 339; 156/212, 221, 293, 156/307.1, 307.7; 428/116, 304.4, 306.6, 428/309.9, 311.11, 34.1, 34.5, 34.6, 36.5, 428/36.91, 58, 119, 101, 103
See application file for complete search history.

(56) References Cited

U.S. PATENT DOCUMENTS

| | | | |
|---|---|---|---|
| 5,741,574 A | 4/1998 | Boyce et al. | |
| 5,789,061 A | 8/1998 | Campbell et al. | |
| 5,869,165 A * | 2/1999 | Rorabaugh et al. | 428/105 |
| 6,146,576 A * | 11/2000 | Blackmore | 264/404 |
| 6,291,049 B1 * | 9/2001 | Kunkel et al. | 428/99 |
| 2008/0226876 A1 | 9/2008 | Roth | |
| 2009/0252917 A1 | 10/2009 | Weber et al. | |

OTHER PUBLICATIONS

German Office Action, German Application No. 10 2008 006 981.7-6, Jul. 1, 2010, 5 pages.

* cited by examiner

*Primary Examiner* — David Bryant
*Assistant Examiner* — Matthew Beisel
(74) *Attorney, Agent, or Firm* — Fenwick & West LLP

(57) ABSTRACT

The present invention provides a method of producing a construction, in particular a sandwich construction for the aeronautical and aerospace fields, comprising the following steps. A heating material is initially applied on one side of a core construction material. In a further step a reinforcing element is introduced into the core construction material and the heating material in such a way that the reinforcing element extends through the core construction material and the heating material and has a portion which projects beyond the heating material. The heating material is then heated to soften the projecting portion at least in regions and said projecting portion is subsequently deformed using the softened region as a pivot point to engage the core construction material from behind and to form the construction. This method is distinguished in particular by the fact that it allows the portions to be heated substantially simultaneously, and not sequentially as in the state of the art. The time saved as a result in turn has a positive effect on production costs.

9 Claims, 1 Drawing Sheet

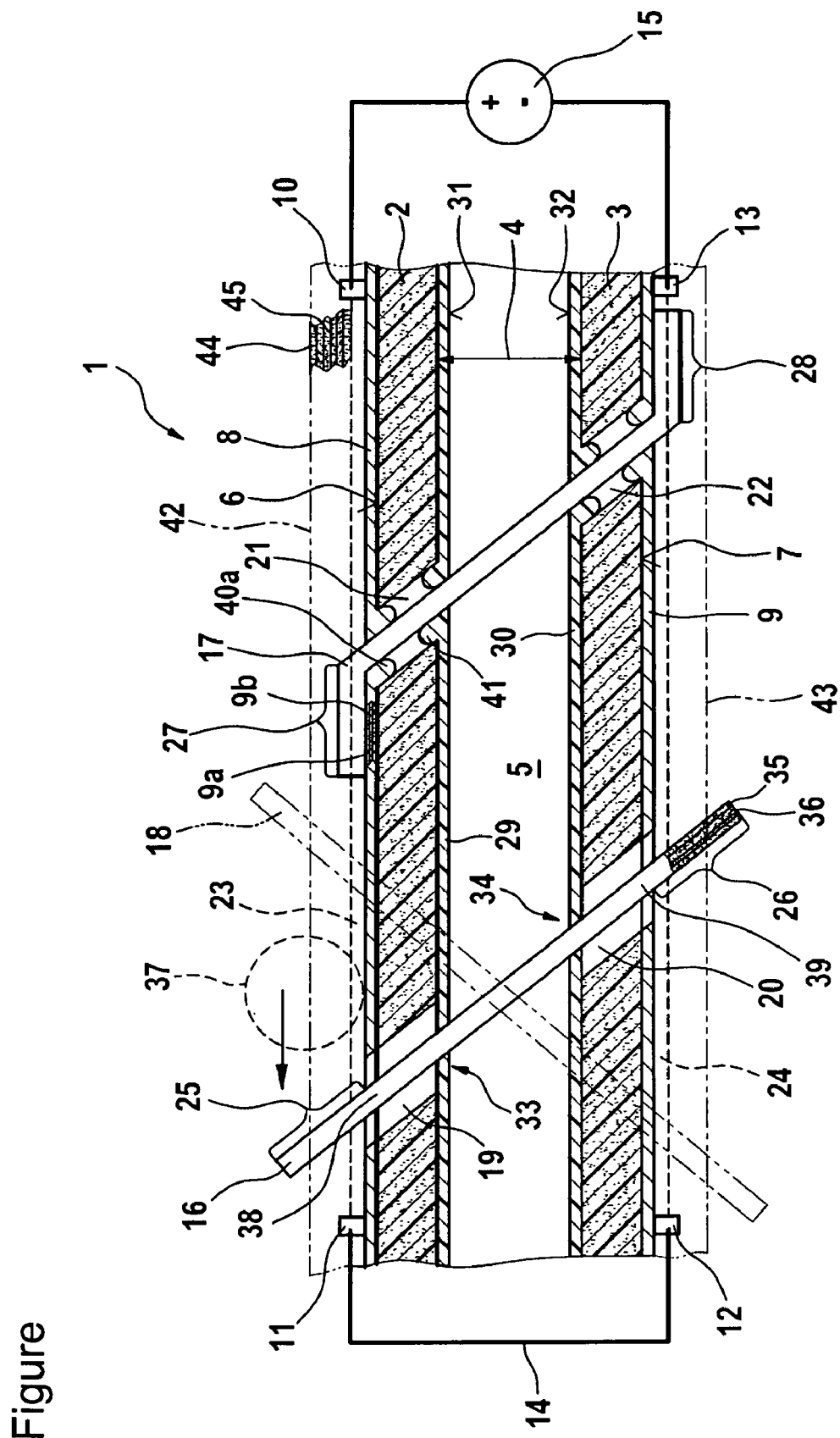
Figure

METHOD FOR PRODUCING A SANDWICH CONSTRUCTION, IN PARTICULAR A SANDWICH CONSTRUCTION FOR THE AERONAUTICAL AND AEROSPACE FIELDS

CROSS-REFERENCE TO RELATED APPLICATIONS

This application claims the benefit under 35 U.S.C §119(e) of U.S. Provisional Application No. 61/024,961, filed Jan. 31, 2008, the entire disclosure of which is herein incorporated by reference.

BACKGROUND OF THE INVENTION

The present invention relates to a method for producing a construction, in particular a sandwich construction for the aeronautical and aerospace fields, and to a construction of this type, in particular a sandwich construction for the aeronautical and aerospace fields.

In high-tech fields, such as aircraft construction, sandwich constructions have a wide range of applications due to the good stiffness and strength to density ratios thereof. A sandwich construction is generally composed of a core layer which has a cover layer on the upper and lower sides respectively thereof.

In order to reinforce a sandwich construction of this type, it has become known to insert rod-shaped reinforcing elements, for example what are known as "pins", into the core layer, a rigid foam for example, in the direction of the thickness thereof, before applying the cover layers on the upper and lower sides. Pins of this type may be produced in a pultrusion process for example. In pultrusion processes, initially dry fibres are impregnated with a thermosetting matrix and subsequently pulled through a heated extruder die. This causes the matrix to cross-link, at least in part, and this provides the reinforcing elements with a certain level of inherent rigidity to allow said elements to be introduced into the core layer.

The following approach has been developed in the state of the art to further reinforce the sandwich construction. The reinforcing elements are formed so as to be of such a length that they have a portion which projects beyond the upper and lower sides of the core layer. These projecting portions of the reinforcing elements are then folded over individually in a further step by a pair of heated tongs in such a way that they engage the core layer from behind. In a further step, the two cover layers mentioned above are applied on the upper and lower sides of the core layer, including the respective projecting portions of the reinforcing elements resting on said sides. The two cover layers, which are conventionally formed of a bonded fibre fabric which is pre-impregnated with a resin matrix, are subsequently cured together with the partly cross-linked reinforcing elements and the core layer under the effect of pressure and heat.

The approach described above has been found to have the drawback that it is necessary to initially grip each of the projecting portions of the reinforcing elements individually with the heated tongs and to then wait for a predetermined time until the projecting portion is sufficiently softened to enable it to be folded down so as to engage the core layer from behind. This process is comparatively time-consuming and therefore costly.

DE 10 2005 035 681 A1 discloses a manufacturing method for reinforcing core materials for sandwich constructions and for reinforcing sandwich constructions. DE 10 2005 024 408 A1 discloses a method for strengthening foam materials. U.S. Pat. No. 6,291,049 B1 discloses a sandwich construction and a method for the production thereof using pins.

BRIEF DESCRIPTION OF THE INVENTION

It is therefore the object of the present invention to provide an improved method for producing a construction, in particular a sandwich construction for the aeronautical and aerospace fields, and/or a construction, in particular a sandwich construction for the aeronautical and aerospace fields, which reduces the waiting time required to heat the projecting portions in order to soften them.

This object is achieved according to the invention by a method with the features of disclosed herein and/or a construction with the features disclosed herein.

A method for producing a construction, in particular a sandwich construction for the aeronautical and aerospace fields, with the following steps is accordingly provided. A heating material is initially applied on one side of a core construction material. In a further step, a reinforcing element is introduced into the core construction material and the heating material in such a way that the reinforcing element extends through the core construction material and the heating material and has a portion which projects beyond the heating material. The heating material is then heated to soften the projecting portion at least in regions and said projecting portion is subsequently deformed using the softened region as a pivot point to form the construction.

A construction, in particular a sandwich construction for the aeronautical and aerospace fields, is also provided. The construction comprises a heating material which is applied on one side of a core construction material. The construction further comprises a reinforcing element which extends through the core construction material and the heating material and has a portion which projects beyond the heating material. In this way, the projecting portion of the reinforcing element is provided so as to be heatable at least in regions by the heating material so as to deform the projecting portion.

The idea on which the present invention is based is that, in contrast to the approach according to the state of the art described above, heating can be carried out simultaneously since the heating material is arranged substantially adjacent (therefore in a contacting manner or with a slight gap) to each of the pivot points of the projecting portions and heat can therefore be supplied to each of these pivot points substantially simultaneously by activating the heating material. This simultaneous action results in savings in both time and expenditure over the known sequential approach.

Advantageous embodiments and improvements of the invention are contained in the sub-claims.

The term "reinforcing elements" is preferably to be understood in the present case as a rod-shaped semi-finished part. This semi-finished part can be produced in a pultrusion or extrusion process and may have for example a round, triangular, quadrilateral, hexagonal, tubular or other cross-section. In this case, the reinforcing element may be formed with or without reinforcing fibres, for example carbon fibres. The reinforcing element may contain a thermoplastic polymer or a thermosetting polymer in addition to the reinforcing fibres.

The term "core construction material" is preferably to be understood in the present case as a foam material, in particular a rigid foam, a prepreg material or a dry bonded or woven fabric, a metal film or any combination thereof. The core construction material is preferably formed so as to be self-supporting, that is to say that it exhibits an inherent stability without any additional means.

When mention is made in the present document of "applying" a material on another material, this means in particular placing (and/or laying) one material on the other and connecting one material to the other in a material-uniting manner.

A plurality of reinforcing elements are preferably introduced into the core construction material and the heating material.

The projecting portion is preferably deformed using a roller which is moved substantially parallel to the core construction material. A plurality of projecting portions of the plurality of reinforcing elements are preferably deformed simultaneously by the roller.

The construction may be formed for example as a hollow construction, i.e. two core construction materials are provided at a distance from one another. The distance between the two core construction materials is thus bridged by the reinforcing element which connects the two materials. The heating material can then be applied on the respective sides remote from the other core construction material. The reinforcing element in this case extends through the two core construction materials and through the two heating materials and optionally through an intermediate material applied on each of the heating materials. The cover layers are in turn applied on each of the heating materials or each of the intermediate materials, including the projecting portion of the reinforcing element resting thereon.

The core construction material in the arrangement described above may of course also be formed as a filled construction, i.e. the cavity described above between the two core construction materials is also filled with core construction material; therefore only one core construction material, which may be thicker in some circumstances, is provided.

The reinforcing elements may extend for example at different angles through the core construction material. When the core construction material is formed as a core construction layer, they preferably extend through the material in the direction of the thickness thereof or at a non 90° angle for example 30 to 70° to the direction of thickness. The cross-members formed in this way reinforce the core construction material.

According to a preferred development of the method according to the invention, the projecting portion is deformed in such a way that it comes to lie on the heating material or on an intermediate material applied thereon. An intermediate material can be applied on the heating material either after or before the heating material is applied on the core construction material. After the deformation step, the projecting portion may be rigidly connected to the heating material or the intermediate material by curing the entire construction. For this purpose, the heating material or the intermediate material preferably comprises a matrix, in particular an epoxy resin, in which the deformed, projecting portion is immersed at least in part and with which it is then cured. The intermediate material is advantageously formed of a very strong composite fibre material, for example a CFRP prepreg with a very high fibre density. The intermediate material can then form a very secure anchoring point for the projecting portion of the reinforcing element.

The heating material is preferably applied directly on the core construction material. The intermediate material is preferably also applied directly on the heating material.

According to a further preferred development of the method according to the invention, a cover material is applied on the heating material or the intermediate material, including the portion of the reinforcing element resting thereon. In this way, the projecting portion of the reinforcing element is advantageously sandwiched between the heating material or intermediate material and the cover material, thus resulting even greater strength in the construction produced.

According to a further preferred development of the method according to the invention, the heating material, the intermediate heating material and/or the cover material comprise a matrix which becomes free-flowing by heating the heating material, thereby causing the matrix to flow into an annular gap between the reinforcing element and the core construction material and thus to seal this gap. The reinforcing element is preferably introduced into the core construction material and the heating material by penetrating said material. This forms, on a microscopic level, an annular gap between the reinforcing element and the core construction material or the heating material. The annular gap can therefore be simply sealed by way of the development described above, thus preventing damaging substances penetrating the construction.

When mention is made of "matrix" in this document, this preferably refers to a thermosetting polymer matrix. However, this may also be a thermoplastic or other matrix.

In addition to the components which release heat, such as one or more electrical resistor elements, the heating material preferably comprises the matrix for the annular gap. It is thus no longer necessary to provide the matrix separately and this may enable the process to be simplified. Alternatively, the intermediate material or the cover material may also comprise the matrix for the annular gap.

According to a further preferred embodiment of the method according to the invention, a further intermediate material is applied to the other side of the core construction material, at least in the region of an annular gap between the reinforcing element and the core construction material, a matrix in the intermediate material becoming free-flowing by heating the heating material, thereby causing the matrix to flow into the annular gap and thus to seal said gap. The other side of the core construction material in this case is preferably positioned opposite the one side, the annular gap extending from the one side to the other of the core construction material. The annular gap may in this case also be formed by penetration of the reinforcing elements. The matrix of the intermediate material thus seals the annular gap substantially on the other side of the core construction material. This may be carried out in addition to or as an alternative to the method described above for sealing the annular gap on the one side of the core construction material. This also prevents damaging substances from the environment from penetrating the construction. If the further intermediate material is applied, for example sprayed, in the form of a coating in only the region of the annular gap adjacent to the reinforcing element on the other side of the core construction material, the desired density can be attained with low material consumption.

According to a further preferred development of the method according to the invention, the heating material, the intermediate material, the further intermediate material, the reinforcing element and/or the cover layer comprises a matrix which is cured by heating the heating material. It is thus advantageously possible to cure the entire construction, i.e. it is no longer necessary to place the construction in a furnace or autoclave in order for it to cure under the effect of pressure and heat. For this purpose, the matrix is formed as a thermosetting matrix, in particular an epoxy resin matrix.

According to a further preferred development of the method according to the invention, the reinforcing element comprises a thermosetting polymer material and/or fibres which are cross-linked only in part. It is crucial that the projecting portion of the reinforcing element can (still) be (sufficiently) softened by heating the heating material.

The term "cross-linked in part" refers in the present document to a degree of cross-linking of between 0 and 100%. However, the projecting portion of the reinforcing element is preferably cross-linked to a degree of 30 to 80% for example which ensures the reinforcing element is dimensionally stable to enable it to penetrate into the core construction material.

The term "curing" is to be understood in the present document as increasing the degree of cross-linking of the matrix, and is to be understood in particular as obtaining a degree of cross-linking of virtually 100%.

According to a further preferred development of the method according to the invention, the heating material is formed as a resistive heating material with electrical contacts for connection to a power source. The resistive heating material thus provides resistance in such a way that suitable heating power is provided when current flows through said heating material. Alternatively, it is also possible for the heating material to be heated inductively. In this case, the heating material may comprise carbon fibres, carbon nanoparticles or metal particles. These may then be excited "wirelessly" by means of an induction device to release the desired heating power.

According to a further preferred development of the method according to the invention, the heating material is formed from a carbon material provided with electrical contacts and/or glass. A heating material of this type can be easily obtained.

The heating material, sandwich material, intermediate material, further intermediate material and/or cover material is preferably formed as a layer.

The embodiments of the production method also apply correspondingly to the construction.

DETAILED DESCRIPTION OF THE INVENTION

The invention will be described in greater detail below on the basis of embodiments with reference to the appended drawing.

The FIGURE is a sectional view of a state in the production of a construction 1 according to a preferred embodiment of the invention.

Two core construction layers 2 and 3 are initially held at a distance 4 from one another, forming a cavity 5 between them (referred to in this document as a hollow construction). The core construction layers 2 and 3 are preferably formed from a foam, in particular a rigid foam.

In an alternative to the hollow construction, a single core construction layer may also be used (referred to in this document as a filled construction) in which the cavity denoted with the reference numeral 5 would be filled with core construction material. All of the comments below also apply to the filled construction.

The core construction layers 2, 3 are each provided on their sides 6 or 7, which are remote from one another, with heating layers 8 or 9. The heating layers 8 and 9 are preferably formed from a resistive heating material. For example, this may be a carbon fibre material 9a which is mixed with glass and a matrix 9b, an epoxy resin in particular. The heating layers 8, 9 comprise electrical terminals 10 and 11 or 12 and 13. In this case, the terminals 11 and 12 are connected directly to one another by an electrical conductor 14. Connected to the terminals 10 and 13 is a power source 15 which is formed so as to send a current from the contact 10 through the heating layer 8 (i.e. through the fibres 9a), through the contact 11, through the line 14, through the contact 12, through the heating layer 9 and through the contact 13 back to the power source 15.

Before or after this, reinforcing elements 16, 17 and 18 (the reinforcing element 18 is shown merely in broken lines since it is arranged behind the section shown in the FIGURE), which are produced for example in a pultrusion process, are introduced through the heating layer 8, through the core construction layer 2, through the core construction layer 3, thus bridging the cavity 5, and through the heating layer 9 at an angle of 45° for example. This forms annular gaps 19, 20, 21 and 22 (shown so as to be exaggeratedly large in the FIGURE for greater clarity) in the core construction layers 2 and 3 and the heating layers 8, 9. The reinforcing elements 16, 17 and 18 are formed so as to be elongate and preferably have a substantially circular cross-section. The reinforcing elements 16, 17 and 18 are provided with such a length and are arranged relative to the heating layers 8, 9 and the core construction layers 2, 3 in such a way that they each have portions 25, 26 or 27, 28 that project beyond the heating layers 8, 9 (no further mention will be made to the reinforcing element 18 since it is not required for the description of the following steps).

Before the reinforcing elements 16, 17 are introduced, intermediate layers 23, 24 may be applied on the heating layer 8 or 9. The intermediate layers 23, 24 are preferably formed from a CFRP prepreg material, in particular with a higher fibre density than the heating material. However, the method will be explained further without the intermediate layers 23 and 24 for the sake of clarity (the intermediate layers are therefore also only shown in broken lines in the FIGURE).

It is subsequently possible to apply further intermediate layers 29, 30 to each of the facing sides 31 or 32 of the core construction layers 2 or 3. The further intermediate layers 29, 30 may in particular be coatings formed for example from thermosetting or thermoplastic polymer material. These coatings 29, 30 can be applied easily by a device (not shown in greater detail) which is moved into the cavity 5. As can be seen in the FIGURE, the coatings 29, 30 directly adjoin the reinforcing elements 16, 17 in the regions 33, 34 (shown only by way of example for the reinforcing element 16).

For the sake of clarity, the reinforcing elements 16 and 17 are shown in their different states at different stages in the method. In this case, the reinforcing element 16 shows the state after penetration of the heating layers 8, 9 and the core construction layers 2, 3.

As shown by way of example by portion 26, at least the projecting portions 25 ... 28 comprise fibres 35, for example carbon fibres which are impregnated with a matrix 36, for example an epoxy resin, and which extend in the longitudinal direction of the reinforcing element 16. When the reinforcing element 16 is introduced, the matrix 36 is cross-linked at least in part with a degree of cross-linking of 60 to 80% for example to ensure the reinforcing element 16 has a sufficient level of rigidity.

In order now to be able to fold over the projecting portions 25, 26 of the reinforcing element 16 into the state shown for the projecting portions 27, 28 of the reinforcing element 17, the power source 15 is activated so a current flows through the heating layers 8 and 9, said heating layers thus providing a defined heat output.

The heating layers 8 and 9 may in this case also be configured in such a way that they only provide heat in the region of the reinforcing elements 16, 17.

The matrix 35 in the projecting portions 25 and 26 softens as a result of the heat generated by the heating layers 8, 9 in a region adjacent the heating material. If a force, which is directed towards the heating layer 8 or 9, is applied, for example by a roller 37 (only shown schematically) to the projecting portions 25, 26, the projecting portions 25, 26 fold onto the heating layer 8 or 9 and come to lie thereon substantially parallel thereto, as shown by the reinforcing element 17. The projecting portions 25, 26 are thus folded about notional pivot points 38, 39 towards the heating layer 8 or 9. The projecting portions 27, 28 then engage the heating layers 8, 9 and therefore also the core construction layers 2 or 3 from behind to produce an interlocking fit in the cured state of the reinforcing element 16, 17.

In the folded state of the projecting portions 27, 28, the matrix 35 thereof preferably adhesively bonds to the matrix 9b of the heating layers 8, 9, which is also softened by the heat produced, or with the matrix of the intermediate layers 23 and 24 if these layers are provided.

The heat input into the projecting portions 25, 26 and the related softening thereof results in an increase in the degree of cross-linking in said portions. For example, this may cause the degree of cross-linking to increase from approximately 60% upon penetration of the reinforcing element 16, 17 to a degree of cross-linking of approximately 90%.

As a result of the heat generated by the heating layers 8, 9, the matrix 9b then flows, as indicated by the reference numeral 40a, into the annular gap 21 (the method is described further only in relation to this annular gap by way of example) in the region of the side 6 of the core construction layer 2 and seals said gap so as to make it impermeable to solids and/or liquids. This process is further promoted by capillary action into the annular gap 21.

On the other side 31 of the core construction layer 2 or the other side 32 of the core construction layer 3, the heat generated by the heat layers 8 or 9 causes the coating 29 or 30, also located at least in the region adjacent to the reinforcing element 17 (see regions 33, 34 of reinforcing element 16), to become cross-linked to a greater extent and thus preferably softened in such a way that it flows, as denoted by way of example by the reference numeral 41, into the annular gap 21 from the side 31 and seals said annular gap from the side 31 so as to be impermeable to solids and/or liquids.

Once all the projecting portions 25 to 28 have been folded over, the cover layers 42, 43 are preferably applied on the heating layer 8 or 9, or on the intermediate layers 23, 24 if said layers have been provided. The cover layers 42, 43 comprise fibres 44, preferably carbon fibres which are impregnated with a matrix 45, epoxy resin in particular. In this case, the cover layers 42, 43 may be provided as a prepreg material or arranged dry on the heating layers 8 or 9 (or the intermediate layers 23, 24) and impregnated with the matrix 45 in an infusion process for example. The option of providing prepreg material or arranging the dry fibre material and applying the matrix in the arranged state also applies to the layers 8, 9, 23, 24 described above.

In a further step, the entire arrangement shown in the FIGURE, in particular the matrices 9b, 29, 30, 35, 45 are cured by activating the power source 15 again for a predetermined time. In addition or as an alternative thereto, the entire arrangement shown in the FIGURE may be placed in an autoclave or a furnace to cure under the effect of pressure and/or heat.

Although the invention has been described above with reference to a preferred embodiment, it is not limited thereto but can be modified in a variety of ways.

In particular, the present method is not restricted to the production of sandwich constructions.

In addition, it should be noted that "a" does not rule out a plurality. It should further be noted that features or steps which have been described in reference to one embodiment may also be used in combination with other features or steps of other embodiments or developments described.

What is claimed is:

1. A method of producing a construction, in particular a sandwich construction for the aeronautical and aerospace fields, comprising the following steps:
    applying a heating material on one side of a core construction material;
    introducing a reinforcing element into the core construction material and the heating material in such a way that the reinforcing element extends through the core construction material and the heating material and has a portion which projects beyond the heating material;
    connecting a power source to the heating material;
    heating the heating material to soften the projecting portion at least in a region adjacent the heating material by sending a current generated by the power source through the heating material;
    and
    deforming the projecting portion using the region that has been softened as a pivot point to form the construction.

2. The method according to claim 1, wherein the projecting portion is deformed in such a way that it comes to lie on the heating material or on an intermediate material applied thereon.

3. The method according to claim 1, wherein a cover materrial is applied on the heating material or an intermediate material, including the projecting portion of the reinforcing element which lies thereon.

4. The method according to claim 1, wherein the heating material, an intermediate material and/or a cover material comprises a matrix which becomes free-flowing by heating the heating material, causing the matrix to flow into an annular gap between the reinforcing element and the core construction material and thus to seal said annular gap.

5. The method according to claim 1, wherein an intermediate material is applied on the other side of the core construction material, at least in the region of an annular gap between the reinforcing element and the core construction material, a matrix in the intermediate material becoming free-flowing by heating the heating material, causing the matrix to flow into the annular gap and thus seal said annular gap.

6. The method according to claim 1, wherein the heating material, an intermediate material, the reinforcing element and/or a cover layer comprises a matrix which is cured by heating the heating material.

7. The method according to claim 1, wherein at least the projecting portion of the reinforcing element comprises a thermosetting polymer material which is cross-linked only in part, a thermoplastic polymer material and/or fibres.

8. The method according to claim 1, wherein the heating material is formed as a resistive heating material comprising electrical contacts for connection to said power source.

9. The method according to claim 1, wherein the heating material is formed from a carbon material and/or glass.

* * * * *